W. J. NEWTON.
ADJUSTER FOR ELECTRICAL ATTACHMENTS.
APPLICATION FILED JUNE 22, 1917.
1,275,725.
Patented Aug. 13, 1918.
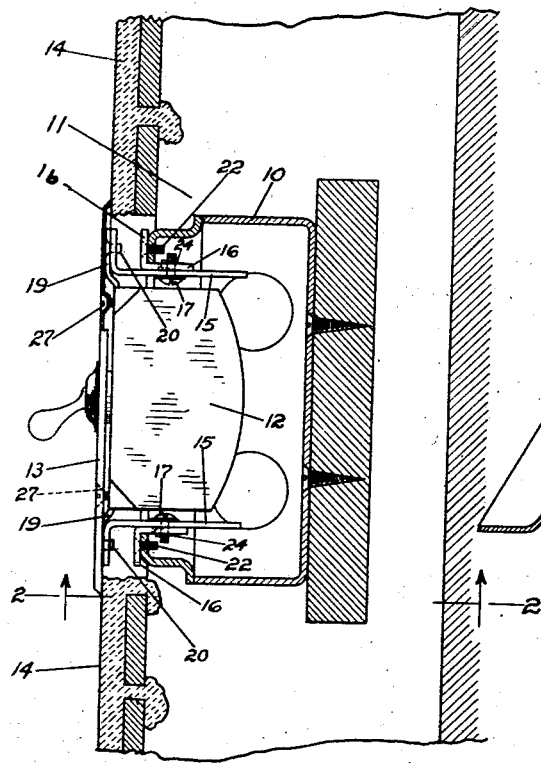
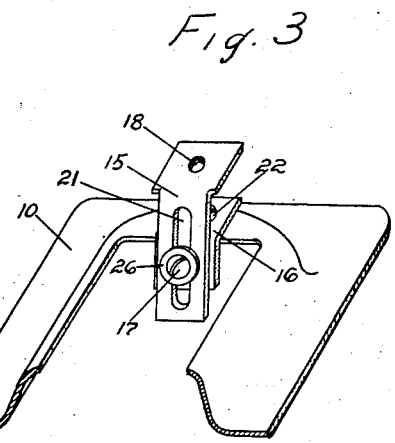
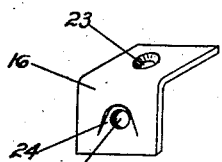
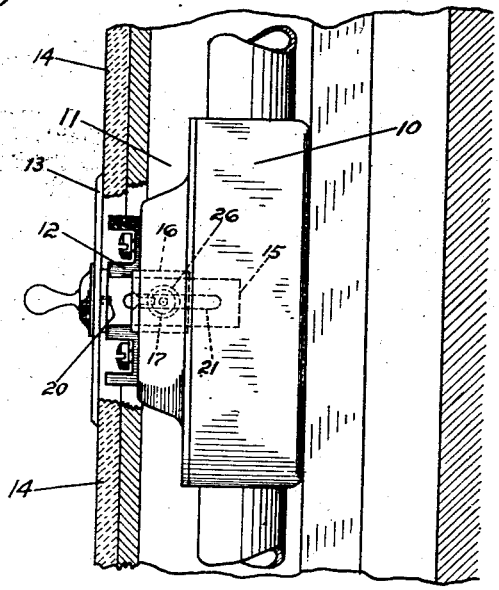
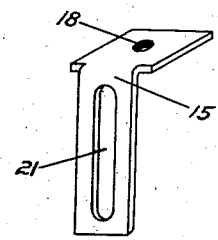
INVENTOR
William J. Newton
BY
A. M. Wooster
ATTORNEY

UNITED STATES PATENT OFFICE.

WILLIAM J. NEWTON, OF BRIDGEPORT, CONNECTICUT, ASSIGNOR TO HARVEY HUBBELL, INCORPORATED, OF BRIDGEPORT, CONNECTICUT, A CORPORATION OF CONNECTICUT.

ADJUSTER FOR ELECTRICAL ATTACHMENTS.

1,275,725.

Specification of Letters Patent.

Patented Aug. 13, 1918.

Application filed June 22, 1917. Serial No. 176,360.

*To all whom it may concern:*

Be it known that I, WILLIAM J. NEWTON, a citizen of the United States, residing at Bridgeport, county of Fairfield, State of Connecticut, have invented an Improvement in Adjusters for Electrical Attachments, of which the following is a specification.

This invention relates to the installation of switches, receptacles and like devices which are used in connection with outlet boxes in wall pockets and are provided with face plates, and the invention has for its object to provide an adjusting device intermediate the switch or receptacle and the outlet box which will provide a rigid support for the switch parallel with the plaster line and without regard to the position of the outlet box.

It is, of course, well understood that in new installations the outlet boxes are usually firmly secured to woodwork before the plaster is applied, and that the plaster usually covers the outlet box and frequently has to be broken away to expose it.

In any event the top of the outlet box usually lies an appreciable distance below the surface of the wall and is frequently out of parallel therewith. Owing to this fact, and to the fact that the face plate should lie parallel with and in close contact with the face of the wall, I have devised, to meet the requirements, the novel adjustable supporting device which I will now describe referring to the accompanying drawing forming a part of this specification and using reference characters to indicate the several parts.

Figure 1 is a longitudinal section through a wall pocket and outlet box, showing a switch or receptacle secured in place by means of my novel adjustable supporting device, the face plate being partly broken away;

Fig. 2 a section on the line 2—2 in Fig. 1, looking in the direction of the arrows, the outlet box, switch and face plate being in elevation;

Fig. 3 a detail perspective view, on an enlarged scale, showing the attachment of my novel adjustable supporting device to an outlet box, and Figs. 4 and 5 are perspective views, respectively, of the members of my novel adjustable supporting device.

10 denotes an outlet box which is shown as rigidly secured in place in a wall pocket 11, 12 a switch, and 13 the face plate of the switch which, through the instrumentality of my novel adjustable supporting device, lies parallel with and in close contact with the face of the wall, indicated by 14. It should be noted that for convenience in description, I use the term switch generically, it being understood of course that my novel adjustable supporting device is equally adapted for use in connection with receptacles and other devices of a similar character.

In new buildings, outlet boxes are generally set in place before plastering. It follows, therefore, that after the plaster is applied, the outlet box will frequently lie an appreciable distance below the plaster line and out of parallel therewith. My present invention provides a device, adapted to be sold independently of the switches and receptacles and used in pairs, which firmly supports the switch, is attached to the outlet box, and which may be easily adjusted to place the member to which the switch is attached flush with and parallel with the plaster line. My novel device comprises simply two L-shaped members, one a switch carrying member and the other an attaching member, which may be formed from sheet metal and are indicated respectively by 15 and 16, and a screw indicated by 17 by which the members are adjustably secured together. For convenience in description, I will refer to the arms of the members as the horizontal and vertical arms. In practice two of my novel adjustable supporting devices are used in connection with each switch, one at each end of the switch. The horizontal arm of member 15 is provided with a threaded hole 18. Each end of the switch is provided with an attaching lug 19 and the switch is secured to the horizontal arm of member 15 by a screw 20 which passes through a hole in the attaching lug and engages threaded hole 18 in said horizontal arm. The vertical arm of member 15 is provided with a slot 21. Member 16 is secured to the top of the outlet box by means of a screw 22 which passes through a hole 23 and engages a threaded hole in the outlet box. The vertical arm of member 16 is provided with an outwardly sprung lug 24 formed by striking out a rounded V-shaped section of the arm leaving one end of the lug attached to the arm. This lug is provided with a threaded hole 25 and the members are adjustably secured together by means of screw 17 which passes through the slot in the vertical arm of member 15 and engages the threaded hole in the lug. A washer 26 is preferably interposed between the head of the screw and the face of member 15. It will be obvious that when the screw is tightened up, lug 24 will be drawn inward, which will tend to lock the screw against rotation, and the vertical arms of the two members will be clamped rigidly together.

The operation is as follows: In installing a switch a member 16 is attached to each end of the outlet box, the vertical arms of the members extending downward. Screws 17 are then passed through the slots in members 15 and turned into the holes in lugs 24. The horizontal arms of members 15 are then placed flush with the plaster line and screws 17 tightened up to lock them in place. It makes no difference, in using my novel supporting and adjusting devices, whether the ends of the outlet box are at the same height relatively to the plaster line or whether the sides of the outlet box are at the same height relatively to the plaster line. Each member 15 is raised sufficiently to place the outer face of the horizontal arm flush with and parallel with the plaster line, the parallelism being secured by swinging the member slightly toward one side or the other as may be required. After the members 15 have been locked at the required adjustment by tightening up screws 17, the switch is placed in position and the attaching lugs thereof are secured to members 15 by screws 20. The face plate is then secured to the switch in any ordinary or preferred manner and will lie flush with and parallel with the plaster line. In the present instance, I have shown the face plate as secured to the switch by screws 27.

Having thus described my invention, I claim:—

1. A device of the character described, comprising an L-shaped member adapted for attachment to an outlet box and having in its vertical arm an outwardly sprung lug provided with a threaded hole, an L-shaped member adapted for attachment to a switch and having in its vertical member a slot, and a screw passing through the slot and engaging the hole in the lug, whereby the switch carrying member may be locked at any required adjustment.

2. A device of the character described, comprising an attaching member having an outwardly sprung lug with a threaded hole, a switch carrying member having a slot, and a screw passing through said slot and engaging the hole in the lug, whereby a switch may be locked at any required adjustment.

In testimony whereof I affix my signature.

WILLIAM J. NEWTON.